Feb. 28, 1967  D. W. PUGH ETAL  3,306,341
FALLING FILM EVAPORATOR FOR STRIPPING LATEX SOLUTIONS
Filed Aug. 14, 1964  2 Sheets-Sheet 1

Duane Wood Pugh
David Crosby Parnell   INVENTORS

BY
Llewellyn A. Proctor
PATENT ATTORNEY

Feb. 28, 1967    D. W. PUGH ETAL    3,306,341
FALLING FILM EVAPORATOR FOR STRIPPING LATEX SOLUTIONS
Filed Aug. 14, 1964    2 Sheets-Sheet 2

Duane Wood Pugh
David Crosby Parnell    INVENTORS
BY
Llewellyn A. Proctor
PATENT ATTORNEY United States Patent Office 3,306,341
Patented Feb. 28, 1967

3,306,341
FALLING FILM EVAPORATOR FOR STRIPPING LATEX SOLUTIONS
Duane Wood Pugh, Baton Rouge, and David Crosby Parnell, East Baton Rouge, La., assignors to Esso Research and Engineering Company, a corporation of Delaware
Filed Aug. 14, 1964, Ser. No. 389,607
5 Claims. (Cl. 159—13)

This invention relates to the combination of an improved stripping column with foam detection and control apparatus. In particular, it relates to such apparatus combination for the detection and control of foaming in columns for stripping volatile components from aqueous dispersions of polymers.

In accordance with certain prior art techniques, volatile components have been removed from aqueous dispersions of polymers by steam stripping. In such operation the steam is injected directly into the liquid-polymeric system to steam distill, strip out, and volatilize the lighter boiling components. A major difficulty often involve in such separation technique, however, is that problem related to excessive foaming.

In an attempt to overcome the acute problem of foaming in certain liquid-polymer systems, a column of special design has been developed and employed, and it has proven quite useful. This column employs a novel plate design wherein liquid-polymeric systems are processed by being caused to cascade downwardly as thin layers in a circuitous or zig-zag path. In such column there is provided a series of open-end and upwardly opening box-like trays spaced away from the column wall in zig-zag, angularly sloped relationship one tray to another. Thus, each tray is provided on the highest three of its four sides with upwardly-extending vertical walls. The trays are extended in pairs from an area of maximum convergence near the wall of the column to a diametrically opposed area of maximum divergence near an opposite side of the wall. The lower plate of a pair at each point of maximum convergence extends beyond the point of convergence and closer to the wall than the upper plate which terminates short of the point of convergence and is so oriented that the side of the plate which has no upwardly extending edge opens into the space created by the convergence. Such column is, in fact, described in U.S. Patent 3,003,930. While this column has alleviated the problem of foaming to some extent, particularly as contrasted with prior art columns, the problem has nevertheless not been completely and satisfactorily solved.

All too frequently, even in this column, excessive foaming yet occurs, and when it does this results in costly interruptions of production. Thus, e.g. when foam covers the fresh feed and recycle inlets to the column, the column ceases to be operational and the auxiliary equipment rapidly fills with the foamed-over latex. Fouling in this manner results in considerable loss of operating time, requires drastically increased operator attention, creates the necessity of diversion of product streams to rerun facilities, produces loss of product to the sewer, and sewer contamination. A siphoning effect which sometimes occurs when the column foams over almost drains the column of its contents, so severely fouling the equipment that several days have been required in such instances to replace the column in operation.

A method of controlling catastrophic foaming in such columns is to periodically and frequently charge excessive quantities of anti-foaming agents into the tower prior to any major accumulation of foam. Unfortunately, however, this interferes with product quality to say nothing of the cost of the agents added.

To the present time no adequate system has been devised to determine to what extent foaming is occurring or where the foam level is located at any given point of time. A major reason for this difficulty is due to the very nature of the liquid-polymeric systems being processed. Devices normally associated with detection and control of liquid levels have proven inadequate because of the formation of gummy deposits upon the sensing ele-means which interferes with normal operation. Many sensing elements, e.g., thermocouples, moreover, cannot function properly because there is a common vapor space in such columns and complete equilibrium exists between all of the trays. Little or no change in temperature or pressure thus occurs from one stage to another. Furthermore, certain elements cannot be used because of the combustible nature of the dispersions. Most of the common sensing elements, then, would not be pratcical.

Despite these and other difficulties, however, it is nonetheless a primary objective of the present invention to overcome these problems and to provide the art with a new and improved apparatus for detection and control of foaming in columns wherein volatile components are stripped from aqueous polymeric dispersions. In particular, it is an object to provide control and detection apparatus in combination with cascade type stripping columns to increase the efficiency thereof when stripping volatile components from liquid-polymeric aqueous dispersions.

These and other objects are achieved in accordance with the present invention embodying the combination of cascade column, of the type mentioned and hereinafter described in detail, for stripping latices; and a capacitance probe operatively connected via an electrical circuit to a relay to detect and measure a change in capacitance between a normal vapor condition and a foaming condition occurring within the column.

The location of a capacitance probe within a column is critical. A probe must be located in an annular, normally foam free, space extending substantially perpendicular to the direction of the vertical plane formed by the liquid flow, and preferably at a location of substantially maximum divergence between an adjacent pair of plates. It is believed that this is necessary so that a probe will be enclosed on all sides by vapor, this tending, inter alia, to keep the probe surface clean and clear of liquid and polymer. This is in sharp contrast with operation wherein the probes are in direct liquid contact, or even where they are in contact with spray or the splashing of polymer solution upon the probe.

Preferably, a series of capacitance probes are used, these being inserted at different levels into the column. Observations can then be conveniently made as to where the foam level is at all times and it is known whether the foam level is rising or falling. In this manner of operation, the foam level is carefully and conveniently controlled, and anti-foaming agents can be added to the column or other operating conditions modified as required for preventing foam-over.

Capacitance probes useful in accordance with this invention are those operating entirely on capacity measurements. Such probes have a single exposed surface for contact with the vapor or with foam. When the probe, previously in contact with the vapor, is contacted with foam as the level of the foam rises, there is a change in circuit capacitance and, at a predetermined level of capacitance, a visual or audio signal, or both, is produced in conjunction with the capacitance circuit or, e.g., an on-off type of control is activated for operation of a pump or valve for initiating flow of an anti-foaming agent, or agents, into the column. By use of this type of capacity measurement, it is assured that no current will flow through the foam, and no electric sparks can be engendered.

The capacitance probe, or probes, must be of extremely high sensitivity and must detect very small changes in the capacitance measured. A probe should be used which will detect changes on the order of less than ten micromicrofarads, and preferably within a range of from one to less than three micromicrofarads. Moreover, a large capacitance surface must be employed, preferably on the order of at least twelve square inches and, more preferably, at least about eighteen square inches. While the upper limits of surface area are, to some degree, contingent on column design, it is best not to exceed an area of about eighty square inches because excessive fouling of the probe by process fluids may occur.

A capacitance probe of cylindrical shape providing an external diameter, exclusive of insulation, of from about one-half to about one inch, and providing a length: diameter ratio of greater than twelve, and preferably greater than twenty-four, has proven quite satisfactory. Probes, even though of such desirable configuration, which do not meet these minimum requirements are not satisfactory, which is quite surprising. Perhaps the reason for this is due to surface fouling by the rapid accumulation of liquid droplets from the process on the surface of such probes.

The invention will be better understood by reference to the accompanying drawings and to the detailed description which makes reference to these drawings. In the drawings.

Figures 1, 2:
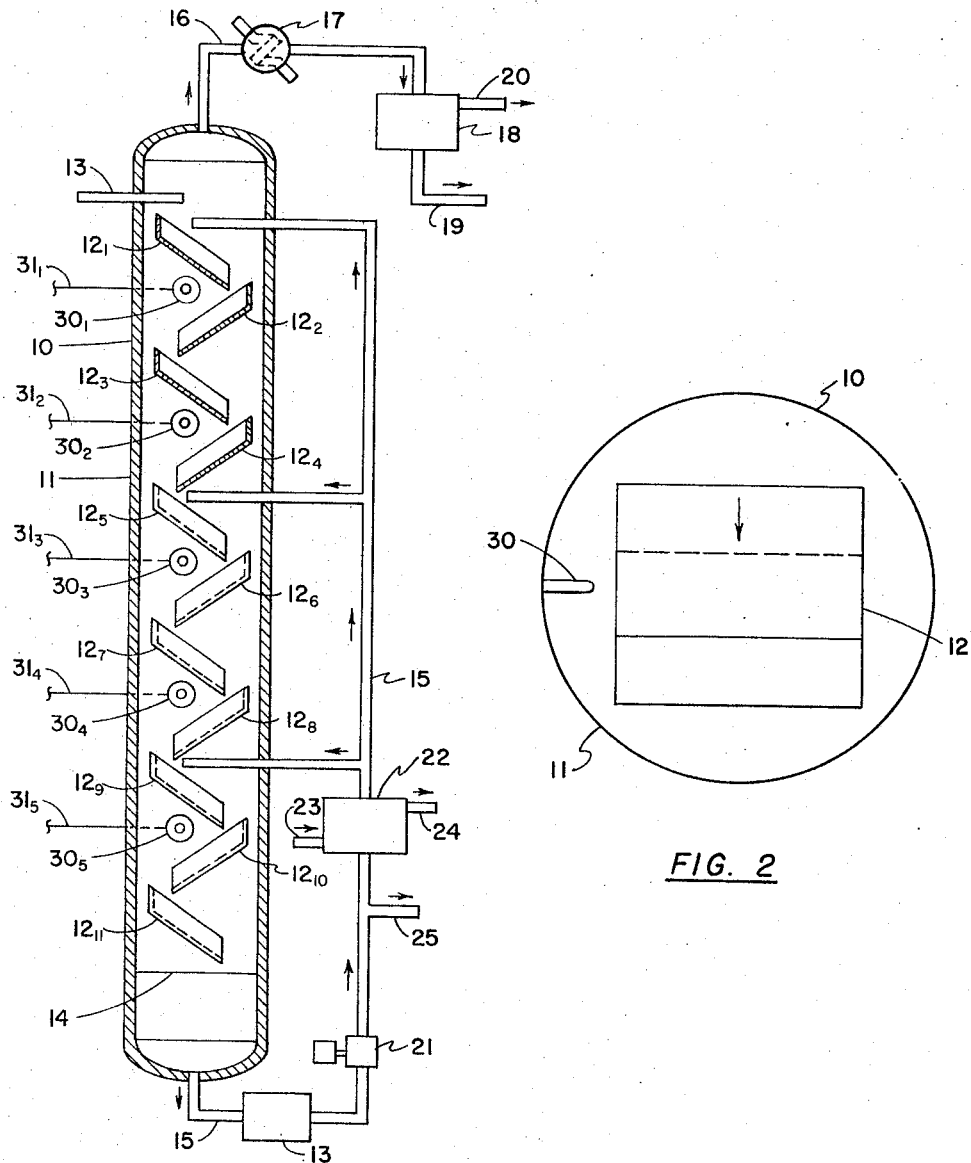
FIGURE 1 illustrates diagrammatically a section view of a stripping column or tower embodying a cascade plate or tray design together with capacitance type detection and control apparatus.
FIGURE 2 illustrates schematically a view looking upwardly upon a tray or plate within the column, and in particular demonstrates a location wherein a capacitance probe is placed within the column.

Referring to FIGURE 1 is shown a column 10 within the shell or walls 11 of which is contained a series of box-like, open-end trays $12_1$ through $12_{11}$. Each of trays 12, it will be noted, is provided on three sides with upwardly turned or vertically projecting edges, leaving an open end. Each of trays 12 is spaced apart and tilted downwardly, at angles from 1 to 45° from horizontal, in alternate directions, an open end of a tray facing away from the open end of another. Individual adjacent pairs of trays 12 converge throughout the length of column 10. Each tray 12 is supported within the column 10 by conventional means (not shown). At a point of convergence of a pair of trays 12, a lower tray extends beyond the actual point of convergence while an upper tray terminates short of the point of convergence.

In this manner of arrangement, liquid from the open end of an upper tray is discharged downwardly into the area of the lower tray or upon the face extending beyond the point of convergence. Hot latex thus introduced into column 10 via inlet 13 flows into upwardly facing open-end tray $12_1$ and the liquid cascades downwardly to a next lower tray $12_2$, and so on to a next lower tray, changing direction with each succeeding lower tray. Hot recycle latex introduced into column 10 and upon trays $12_1$, $12_5$, $12_9$ via lines $15_1$, $15_2$, $15_3$, respectively, of manifold line 15 also cascades downwardly from these trays to the next lower trays $12_2$, $12_6$, $12_{10}$, and from these to the next succeeding lower trays of column 10. In this manner the volatile components are vaporized.

The vaporized components from the latex ascend within column 10, pass through overhead line 16, are condensed with passage through condenser 17 and the liquid then collected and stratified within vessel 18. Water and solvent are drawn from vessel 18 via lines 19, 20, respectively.

Stripped latex accmulates at the bottom of column 10 below the lowermost tray $12_{11}$ where a liquid level 14 is maintained. The stripped latex is passed via line 15 through filter 13 to remove coagulated polymer, through pump 21 and thence through heat exchanger 22 heated via exchange with hot water or steam which enters the system through line 23 and exits through line 24. A portion of the stripped latex is then recycled via line 15 and another portion is removed from the column 10 via line 25, or transferred to a succeeding stage, or stages, not shown.

A series of five capacitance probes $30_1$, $30_2$, $30_3$, $30_4$, $30_5$ are shown at different levels within column 10, each being extended into a vapor space and located at a point of generally maximum divergence between pairs of adjacent trays 12. Each probe 30 is connected via leads $31_1$, $31_2$, $31_3$, $31_4$, $31_5$ to an electrical circuit operating a relay.

In FIGURE 2 is schematically shown the proper location of a capacitance probe 30. The probe is inserted into wall 11 of column 10 and within an annular space between wall 11 and a tray 12, and at a location which is perpendicular to the direction of flow of the liquid cascading downwardly along tray 12. The horizontal directional component of flow is represented by the arrow. The other direction of flow not indicated is, of course, vertically downward. By location of the probe in this manner, it remains out of contact with liquid and is normally surrounded only by the vapor or rising foam.

Figure 3:
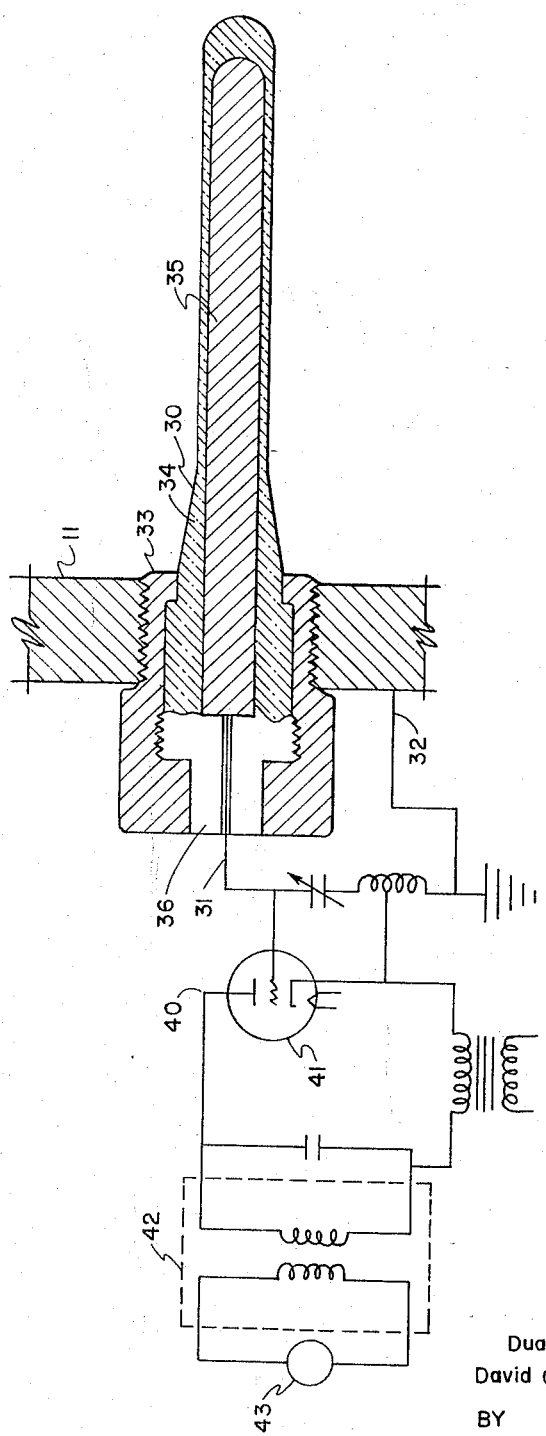
FIGURE 3 shows in detail a capacitance probe with representative electrical circuit for operation of a relay.

In FIGURE 3 is shown a single capacitance probe 30 with circuitry in communication with relay means for producing a visual or audio signal or for control of valve or pump means so that when a preselected signal is received by contact of the probe with foam an anti-foaming material, or materials, can be injected into column 10. Preferably, the capacitance probe is used with an electronic oscillator with feed-back ratio control as a portion of the detection device. The oscillator is biased to draw only a small amperage, e.g., 1½ milliamps, when properly tuned and oscillating, and this preselected desired condition is when the probe within the annular space of column 10 is surrounded only by vapor. By the use of feed-back ratio control, the oscillations cease when the probe is covered with foam and the current flow may increase to 10 milliamps, thus insuring positive operation of the relay.

A probe 30 is supplied with a male thread member 33 for fastening into wall 11 of column 10 and a female adaptor member 34 is provided to electrically insulate from member 33 and wall 11 and to generally protect the capacitance element 35 from column conditions. This adaptor 34 also serves to attach the probe 30 in place. An electrical lead 31 attached to probe 30 is electrically insulated from male thread member 33 by insulation packing 36. Foaming vis-a-vis vapor conditions is indicated within column 10 by measurement of the capacitance existing between probe element 35 and wall 11.

Electrical leads 31, 32 are in communication with tank circuit 40. When no foam is in contact with probe 30, the circuit is oscillating and only a very small current is passed within electron tube 41. When probe 30 is contacted by foam, however, the capacitance between the probe and the wall 11 is reduced and oscillations are lessened or cease. The grid bias is reduced, the tube 41 fires, and greater current flows through the circuit to energize the relay 42. When relay 42 is energized, an audio or visual signal, or both, is produced; or the relay may be used to activate a circuit to operate a device for correcting the foaming condition. This, for example, may be a pump, a valve, or other device for initiating a flow of anti-foaming material into column 10 through a conduit not shown. Such device is represented schematically in the drawing by numeral 43. When the condition is corrected and foam no longer covers probe 30, current ceases to flow in circuit 40 and relay 42 is de-energized. This cycle is repeated ad infinitum with the rise and fall of the foam level.

This invention is applicable to any cascade stripping column wherein volatile components are separated from the liquid-polymer solutions or dispersions and wherein foaming conditions are prevalent. It is especially useful for the removal from such solutions or dispersions of organic, e.g., hydrocarbon, solvents or water, or both. The invention is particularly useful with polymeric dispersions including butyl rubber, polyisobutylene, polybutadiene, ethylene-propylene copolymers, polyisoprene, ethylene-propylene terpolymers, and the like.

By way of example, when an aqueous dispersion of a solution of butyl rubber in hexane containing about 14% solids was stripped of hexane in a first stage to produce a latex ranging from about 35–38% solids and in a second stage concentrated to about 50–55% solids at column temperatures and pressures of from about 195° F. and 14.7 p.s.i.a. and 170° F. and 5 p.s.i.a., respectively, and it was found that the normal production per unit of time was increased by about 220% when using the present invention as contrasted with otherwise similar runs but runs wherein capacitance probes were not employed. Moreover, product quality is considerably improved because minimal amounts of an anti-foaming agent were employed.

It is apparent that some modifications and changes can be made without departing the spirit and scope of the invention. Accordingly, the invention should be construed only within the spirit and scope of the appended claims.

Having described the invention, what is claimed is:

1. In combination, a column having an upper liquid inlet and a lower outlet means, said column including a cylindrical casing wall within which is provided a staged series of vertically superposed generally transverse, upwardly facing, open-end, box-like trays having corresponding lateral edges spaced from the wall defining a pair of parallel vertical planes and providing an annular space between the edges of said trays and said wall, adjacent pairs of trays converging with open ends facing one away from another, the lower tray of a pair extending beyond the point of convergence and the upper tray with its open end terminating short of the point of convergence so that liquid can fall into and cascade downwardly in a generally vertical zig-zag path from one tray to another, a plurality of capacitance probes located at different levels within the column walls and extending into said annular space substantially perpendicular to the parallel planes, a foam corrective device, said capacitance probes being operatively connected to said foam corrective device to operate said device when a change of capacitance is measured, each of said probes having a sensitivity range of up to about ten micromicrofarads and a surface area of between twelve and eighty square inches and a diameter ranging from about one-half inch to about one inch and a length to diameter ratio greater than twelve.

2. A combination comprising, a column having an upper primary liquid inlet, a lower outlet means, and a plurality of vertically spaced secondary liquid inlets between said primary liquid inlet and outlet means, said column including a cylindrical casing and a plurality of vertically superposed, generally transverse, rectangular box-like open end trays having corresponding lateral sides, said trays being mounted and arranged within said casing so as to directly receive and convey liquid introduced through said primary and secondary inlets, by gravity, downwardly in alternate declined converging directions defining a generally vertical zig-zag path toward said outlet means, said trays having a width dimension substantially less than the interior diameter of said cylindrical casing thereby producing a pair of vertically extending void sectors between the sides of said trays and said casing, a plurality of capacitance probes protruding through said casing into one of said void sectors adjacent said superposed trays perpendicular to said path and terminating within the sector, said probes being vertically spaced at predetermined locations below the levels of said primary and uppermost of said secondary liquid inlets, whereby one or more of said probes will undergo a change in capacitance when contacted by foam overflowing from said trays into said void sector.

3. The combination of claim 2 wherein each of said capacitance probes has a sensitivity range of up to about ten micromicrofarads and a surface area of between twelve and eighty square inches and a diameter ranging from about one-half inch to about one inch and a length to diameter ratio greater than twelve.

4. The combination of claim 2 including foam corrective control means responsive to said probes for introducing an anti-foaming agent into said column upon a decrease in capacitance of any of said probes.

5. The combination in accordance with claim 4 including an overhead vapor removal line in an upper portion of said column and a cascading solution of butyl rubber and hexane upon said trays, wherein the vapors from said hexane rise upwardly in said void sector toward said overhead vapor removal line, said vapors being effective during normal non-forming column operation to surround said probes on all sides and keep said probes substantially free of butyl rubber accumulations.

References Cited by the Examiner

UNITED STATES PATENTS

| | | | |
|---|---|---|---|
| 1,984,789 | 12/1934 | Everett | 252—361 X |
| 2,433,060 | 2/1947 | Ohsol et al. | 203—20 |
| 2,438,550 | 3/1948 | Ertzman | 324—61 |
| 2,542,372 | 2/1951 | Taylor et al. | 324—61 |
| 2,783,420 | 2/1957 | Thompson et al. | 324—61 |
| 2,958,018 | 10/1960 | Kocmich | 324—61 X |
| 3,003,930 | 10/1961 | Pugh et al. | 202—46 |
| 3,027,307 | 3/1962 | Stoffer et al. | 202—160 |

NORMAN YUDKOFF, *Primary Examiner.*

J. SOFER, *Assistant Examiner.*